US012680818B2

(12) United States Patent
Cha

(10) Patent No.: US 12,680,818 B2
(45) Date of Patent: Jul. 14, 2026

(54) VEHICLE CONTROL APPARATUS AND METHOD

(71) Applicants: HYUNDAI MOTOR COMPANY, Seoul (KR); Kia Corporation, Seoul (KR)

(72) Inventor: Jung Min Cha, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 150 days.

(21) Appl. No.: 18/384,967

(22) Filed: Oct. 30, 2023

(65) Prior Publication Data

US 2024/0384998 A1 Nov. 21, 2024

(30) Foreign Application Priority Data

May 16, 2023 (KR) ........................ 10-2023-0063243

(51) Int. Cl.
*G01C 21/34* (2006.01)
*G01C 21/36* (2006.01)
(52) U.S. Cl.
CPC ....... *G01C 21/3461* (2013.01); *G01C 21/362* (2013.01); *G01C 21/3697* (2013.01)
(58) Field of Classification Search
CPC ............ G01C 21/3461; G01C 21/3469; G01C 21/3697; G01C 21/3453
See application file for complete search history.

(56) References Cited

U.S. PATENT DOCUMENTS

| | | | |
|---|---|---|---|
| 9,290,173 B2 | 3/2016 | Kobayashi et al. | |
| 2015/0203103 A1 | 7/2015 | Kobayashi et al. | |
| 2017/0297563 A1* | 10/2017 | Kava | G01C 21/26 |
| 2018/0072118 A1* | 3/2018 | Dudar | B60D 1/248 |
| 2019/0168773 A1* | 6/2019 | Hamdoun | B60W 30/146 |
| 2024/0035838 A1* | 2/2024 | Shi | G01C 21/00 |

FOREIGN PATENT DOCUMENTS

WO 2013/108401 A1 7/2013

* cited by examiner

*Primary Examiner* — Hunter B Lonsberry
(74) *Attorney, Agent, or Firm* — MORGAN, LEWIS & BOCKIUS LLP

(57) ABSTRACT

A vehicle control apparatus includes a location acquisition device that provides information on road gradients on at least one route to a destination, a sensor that obtains driving information of a towing vehicle to which a towed vehicle is connected, and a controller which is configured for determining a towable weight for each of routes found for the destination based on the information on the road gradients, determines a weight of the towed vehicle based on the driving information, compares the towable weight with the weight, and determines at least one of whether it is possible to tow the towed vehicle, a towable route, a towable weight corresponding to the towable route, or any combination thereof based on a result of the comparing.

20 Claims, 6 Drawing Sheets

20

150

VEHICLE CONTROL APPARATUS AND METHOD

CROSS-REFERENCE TO RELATED APPLICATION

The present application claims priority to Korean Patent Application No. 10-2023-0063243, filed on May 16, 2023, the entire contents of which is incorporated herein for all purposes by this reference.

BACKGROUND OF THE PRESENT DISCLOSURE

Field of the Present Disclosure

The present disclosure relates to a vehicle control apparatus and method.

Description of Related Art

Recently, equipment (camping equipment) required for outdoor leisure activities such as camping is loaded and moved in the trunk of a vehicle, but for easy loading of equipment, a trailer is connected to the rear of the vehicle and equipment is loaded on the trailer.

On the other hand, increased interest in the environment has resulted in an increase in the use of eco-friendly vehicles such as electric vehicles, and accordingly, there are increasing cases in which an eco-friendly vehicle travels while a trailer is being connected to the eco-friendly vehicle. In an electric vehicle, as the weight of a towed vehicle such as a trailer increases or the gradient of a road increases, a load on a vehicle system increases, resulting in overheating of the vehicle, which causes the vehicle to stop, leading to an accident. Therefore, electric vehicles generally provide a towable weight for each road gradient as vehicle specifications.

However, when the driver drives on a road with a large gradient while the towing weight of the towed vehicle is increased without recognizing the gradient of the road to the destination before driving, the power required to drive the vehicle rapidly increases and the vehicle system is overloaded, which leads to a situation where the vehicle is suddenly stopped and is inevitably exposed to the risk of an accident.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus and method for enabling a user to safely drive to a destination by providing a towable weight of a towed vehicle based on information on road gradients on a route to a destination.

Various aspects of the present disclosure are directed to providing a vehicle control apparatus and method for providing guide for a towable weight of a towed vehicle for each road gradient along with at least one driving route and required time for each road gradient on a route to a destination.

Various aspects of the present disclosure are directed to providing a vehicle control apparatus and method for comparing a weight loaded on a vehicle with the towable weight of a towed vehicle for each road gradient and outputting a comparison result to allow a driver to intuitively identify whether it is possible to tow the towed vehicle.

Various aspects of the present disclosure are directed to providing a vehicle control apparatus and method for allowing a driver to select a route to a destination in which driving is possible regardless of a loaded weight of the vehicle based on the towable weight of the towed vehicle for each road gradient or guiding the driver to reduce the weight of the vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus includes a location acquisition device that provides information on road gradients along at least one route to a destination, a sensor that obtains driving information of a towing vehicle to which a towed vehicle is connected, and a controller which is configured for determining towable weights for each of routes found for the destination based on the information on the road gradients, is configured to determine a weight of the towed vehicle based on the driving information, compares the towable weight with the weight, and is configured to determine at least one of whether it is possible to tow the towed vehicle, a towable route, a towable weight corresponding to the towable route, or any combination thereof based on a result of the comparing.

According to an exemplary embodiment of the present disclosure, the controller may perform control to output the towable weights for each of the routes to an output device operatively connected to the controller.

According to an exemplary embodiment of the present disclosure, the controller may be configured to determine a route in which the towable weight exceeds the weight of the towed vehicle among the routes found for the destination as the towable route, and output the towable route.

According to an exemplary embodiment of the present disclosure, the controller may re-search for a new towable route in which driving to the destination is possible regardless of the weight of the towed vehicle when there is no towable route among the routes found for the destination and output a result of the re-search.

According to an exemplary embodiment of the present disclosure, the controller may be configured to determine whether a result of the re-search is selected by a user.

According to an exemplary embodiment of the present disclosure, the controller may provide guide for a route to the destination based on the result of the re-search when it is determined that the result of the re-search is selected by the user.

According to an exemplary embodiment of the present disclosure, the controller may output a guide message to reduce the weight when it is determined that the result of the re-search is not selected by the user.

According to an exemplary embodiment of the present disclosure, the controller may search for a route to the destination based on a plurality route of search options.

According to an exemplary embodiment of the present disclosure, the plurality of route search options may be set based on at least one of a distance, a required time, a cost, and any combination thereof.

According to an exemplary embodiment of the present disclosure, the vehicle control apparatus may further include a communication device configured to receive the destination from a user terminal and transmit the towable weight to the user terminal.

According to an aspect of the present disclosure, a vehicle control method includes determining a towable weight for each of routes found for a destination based on information on road gradients on at least one route to the destination, determining a weight of a towed vehicle based on driving information, comparing the towable weight with the weight, and determining at least one of whether it is possible to tow the towed vehicle, a towable route, a towable weight corresponding to the towable route, or any combination thereof based on a result of the comparing.

According to an exemplary embodiment of the present disclosure, the vehicle control method may further include outputting the towable weights for each of the routes to an output device operatively connected to the controller.

According to an exemplary embodiment of the present disclosure, the vehicle control method may further include determining a route in which the towable weight exceeds the weight of the towed vehicle among the routes found for the destination as the towable route, and outputting the towable route.

According to an exemplary embodiment of the present disclosure, the vehicle control method may further include re-searching for a new towable route in which driving to the destination is possible regardless of the weight of the towed vehicle when there is no towable route among the routes found for the destination and outputting a result of the re-search.

According to an exemplary embodiment of the present disclosure, the vehicle control method may further include determining whether a result of the re-search is selected by a user.

According to an exemplary embodiment of the present disclosure, the vehicle control method may further include providing guide for a route to the destination based on the result of the re-search when it is determined that the result of the re-search is selected by the user.

According to an exemplary embodiment of the present disclosure, the vehicle control method may further include outputting a guide message to reduce the weight when it is determined that the result of the re-search is not selected by the user.

According to an exemplary embodiment of the present disclosure, the vehicle control method may further include searching for a route to the destination based on a plurality route of search options.

According to an exemplary embodiment of the present disclosure, the plurality of route search options may be set based on at least one of a distance, a required time, a cost and any combination thereof.

According to an exemplary embodiment of the present disclosure, the vehicle control method may further include receiving the destination from a user terminal and transmitting the towable weight to the user terminal.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
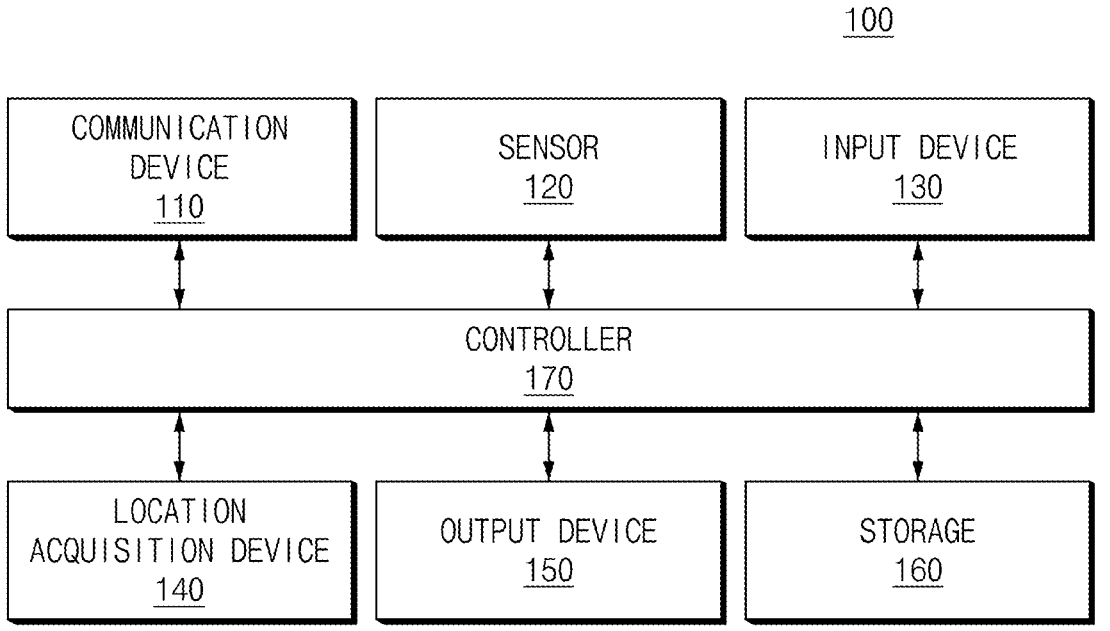
FIG. 1 is a diagram illustrating a configuration of a vehicle control apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is predetermined by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, include the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a configuration of a vehicle control apparatus according to an exemplary embodiment of the present disclosure.

Referring to FIG. 1, a vehicle control apparatus 100 may include a communication device 110, a sensor 120, an input device 130, a location acquisition device 140, an output device 150, and storage 160. The vehicle control apparatus 100 may be provided in a towing vehicle to which a towed vehicle is connected, and may be configured for controlling overall operations of the towing vehicle.

The communication device 110 may perform wired/wireless communication with a user terminal. For example, the communication device 110 may include a transceiver that transmits and receives information using an antenna, a communication circuit, a communication processor, and the like. The communication device 110 may be connected to the user terminal through a USB cable when connected to the user terminal in a wired manner, and may be connected to the user terminal through Wi-Fi direct communication when connected to the user terminal wirelessly. According to an exemplary embodiment of the present disclosure, connection may be performed through via short-range wireless communication, such as wireless broadband, Worldwide Interoperability for Microwave Access (WiMAX), Bluetooth, Radio Frequency Identification (RFID), Infrared Data Association (IrDA), Ultra Wideband (UWB), or Zigbee.

The sensor 120 may include a plurality of sensors that obtain driving information of the towing vehicle to which the towed vehicle is connected. According to an exemplary embodiment of the present disclosure, the plurality of sensors may include an accelerator pedal sensor (APS), a brake pedal sensor (BPS), a pressure sensor, a motor rotation speed sensor, a speed sensor, an inclination sensor, an acceleration sensor, and the like. Through this, the sensor 120 may detect at least one of vehicle acceleration, motor torque, vehicle speed, and driving load.

The input device 130 may receive an input corresponding to a driver's touch, motion, or voice and transmit the received input to a controller 170, and the controller 170 may be configured for controlling an operation of the vehicle in response to the input information. According to an exemplary embodiment of the present disclosure, the input device 130 may include a touch input means or a mechanical input means. For example, the input device 130 may be disposed in one area of a steering wheel, and the driver may operate the input device 130 with a finger while holding the steering wheel. As an exemplary embodiment of the present disclosure, the input device 130 may be implemented as at least one of a motion sensor configured for detecting a driver's motion or a voice recognition sensor configured for detecting a driver's voice and/or a combination thereof.

The location acquisition device 140 may be provided with a Global Positioning System (GPS) receiving device to obtain vehicle location information and may map-match the location of the vehicle to pre-stored map data, provide a map image of a certain area based on the location of the vehicle, and provide route information from the current location to a destination set by the driver. Here, the route information may include a distance to the destination, road gradient information, required time, cost, and the like.

The output device 150 may output a towable weight for each route to the destination according to the control signal of the controller 170, and may output a driving possibility guide message and a guide message for guiding reduction in weight. According to an exemplary embodiment of the present disclosure, the output device 150 may be provided in a vehicle instrument panel, a dashboard, a center fascia, a console box, or the like. The output device 150 may be implemented using a display device employing a liquid crystal display (LCD) panel, a light emitting diode (LED) panel, an organic light emitting diode (OLED) panel, or a plasma display panel (PDP). The liquid crystal display may include a thin film transistor liquid crystal display (TFT-LCD). The output device 150 may be integrally implemented by a touch screen panel (TSP).

The storage 160 may store at least one or more algorithms for performing operations or execution of various commands for the operation of the vehicle control device according to an exemplary embodiment of the present disclosure. The storage 160 may include at least one medium of a flash memory, a hard disk, a memory card, a Read-Only Memory (ROM), a Random Access Memory (RAM), an Electrically Erasable Programmable Read-Only Memory (EEPROM) Memory, a Programmable Read-Only Memory (PROM), a magnetic memory, a magnetic disk, and an optical disk. According to an exemplary embodiment of the present disclosure, the storage 160 may store the towable weights of a towed vehicle for road gradients, which are provided as a vehicle specification when a vehicle is shipped, and an algorithm used to determine the towable weights of the towed vehicle for road gradients.

The controller 170 may be implemented by various processing devices such as a microprocessor incorporating a semiconductor chip configured for operating or executing various instructions or the like and may be configured for controlling an operation of the vehicle control device according to an exemplary embodiment of the present disclosure. The controller 170 may be electrically connected to the communication device 110, the sensor 120, the input device 130, the location acquisition device 140, the output device 150, and the storage 160 through wired cables or various circuits and may transfer electrical signals including control commands and the like and transmit and receive electrical signals including control commands and the like through a communication network including Controller Area Network (CAN) communication. The controller 170 may be configured to determine towable weights for routes found for the destination based on road gradient information of a road to a destination, and determine the weight of a towed vehicle based on the driving information of the towing vehicle obtained by the sensor, compare the towable weight with the weight, and determine at least one of whether it is possible to tow a towed vehicle, a towable route, a towable weight corresponding to the towable route, or any combination thereof.

According to an exemplary embodiment of the present disclosure, the controller 170 may search for a route to a destination set by a user's input. According to an exemplary embodiment of the present disclosure, the controller 170 may search for a route to a destination based on user input information received through the input device 130, and receive the user input information input by a user terminal through the communication device 110 to search for a route to the destination. A more detailed description related thereto will be provided with reference to FIG. 2 and FIG. 3.

Figure 2:
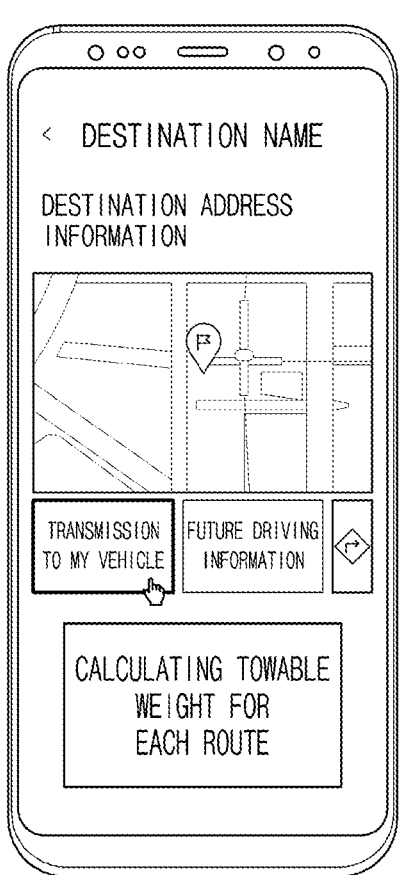
FIG. 2 is a diagram illustrating an exemplary embodiment of inputting a destination and outputting a weight of a towable vehicle according to an exemplary embodiment of the present disclosure.
Figure 3:
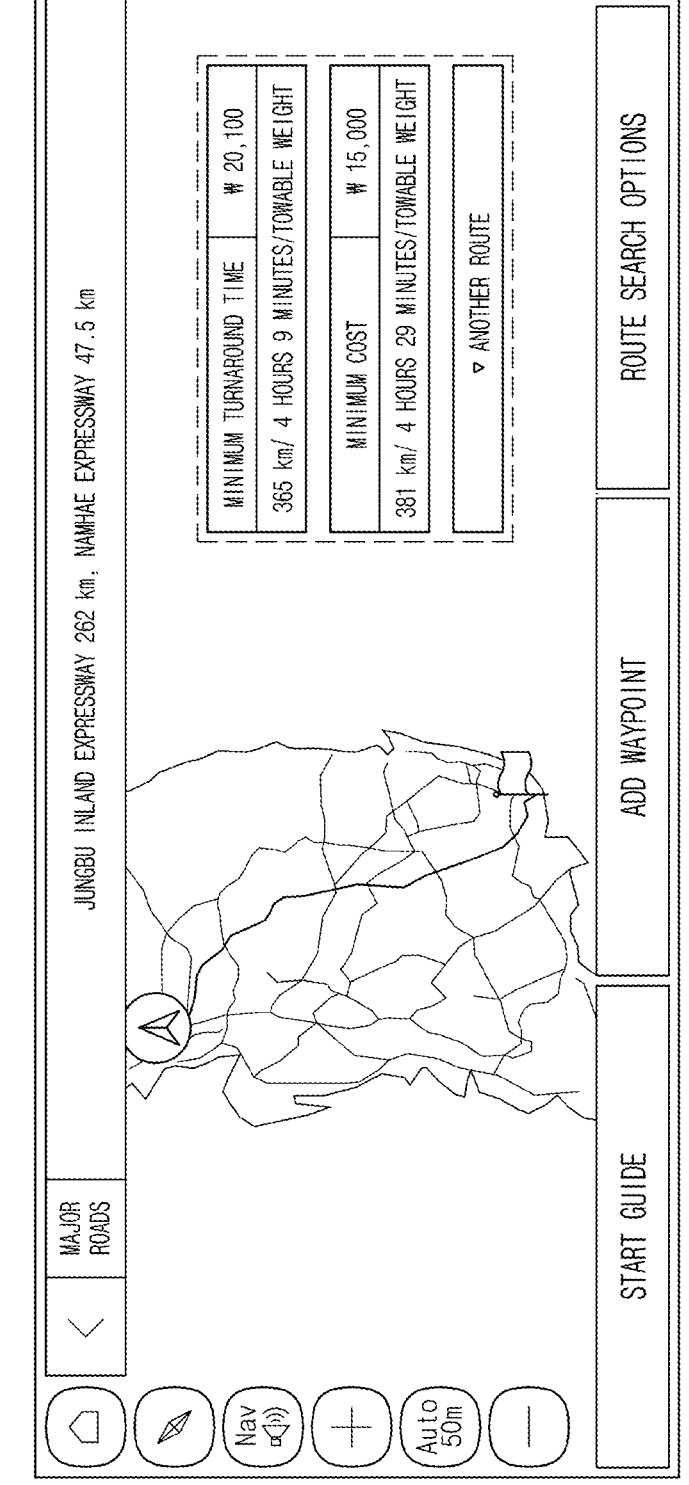
FIG. 3 is a diagram illustrating an exemplary embodiment of inputting a destination and outputting a weight of a towable vehicle according to another exemplary embodiment of the present disclosure.

FIG. 2 and FIG. 3 are diagrams illustrating an exemplary embodiment of inputting a destination and outputting a towable weight of a towed vehicle according to an exemplary embodiment of the present disclosure.

Referring to FIG. 2, a user terminal 20 may output destination address information to the user terminal 20 when a destination name is input by a user, and transmit destination address information to a vehicle when transmission of the destination to the vehicle is input by the user. According to an exemplary embodiment of the present disclosure, the controller 170 may search for a route to the destination when receiving the destination address information transmitted from the user terminal 20.

Referring to FIG. 3, the controller 170 may search for a route to the destination when a destination name is input to the input device 130.

According to an exemplary embodiment of the present disclosure, the controller 170 may search for routes to the destination based on a plurality of route search options. Here, the plurality of route search options may be set based on at least one of a distance to the destination, a time required to arrive at the destination, a cost required to arrive at the destination, or any combination thereof. Accordingly, the controller 170 may search for at least one route according to the plurality of route search options.

According to an exemplary embodiment of the present disclosure, the controller 170 may be configured to determine whether a weight guide option is selected by the user based on a user input received through the input device 130. According to another exemplary embodiment of the present disclosure, the controller 170 may receive the user input by the user terminal through the communication device 110 to determine whether the weight guide option is selected by the user. When it is determined that the weight guide option is selected by the user, the controller 170 may be configured to determine the towable weight for each of at least one route found for the destination to guide the towable weight of the towed device.

According to an exemplary embodiment of the present disclosure, the controller 170 may be configured to determine the towable weight based on road gradient information included in each route found for the destination. For example, the controller 170 may be configured to determine the towable weight according to road gradient information included in at least one route found for the destination using an algorithm applied to determine the towable weight (specification information) for each road gradient stored in the storage 160.

According to an exemplary embodiment of the present disclosure, at least one route may include a route found based on the minimum distance to the destination, a route found based on the minimum time required to reach the destination, and a route found based on the minimum cost required to reach the destination. Accordingly, the controller 170 may be configured to determine the towable weight of the towed vehicle based on gradient information of a road included in a route found based on the minimum distance to the destination, determine the towable weight of the towed vehicle based on gradient information of a road included in a route found based on the minimum time required to reach the destination, and determine the towable weight of the towed vehicle based on gradient information of a road included in a route found based on the minimum cost required to reach the destination.

According to an exemplary embodiment of the present disclosure, the controller 170 may output information on a towable weight for each of at least one route to the destination through the output device 150 when the towable weight for each of at least one route to the destination is determined. According to another exemplary embodiment of the present disclosure, the controller 170 may transmit the towable weight for each of at least one route to the user terminal. Accordingly, the controller 170 may allow the user to easily check the towable weight for each of at least one route to the destination through the user terminal as well as the output device 150.

As shown in FIG. 2, the user terminal 20 may receive and output information on at least one towable weight for each of at least one route determined by the controller 170.

As shown in FIG. 3, the output device 150 may output information on the towable weight for each of at least one route determined by the controller 170. According to an exemplary embodiment of the present disclosure, the output device 150 may output a towable weight determined based on the distance and required time of a route found based on the minimum required time, and road gradient information included in the found route. Furthermore, the output device 150 may output a towable weight determined based on the distance and required time of a route found based on the minimum cost, and road gradient information included in the found route.

According to an exemplary embodiment of the present disclosure, the controller 170 may be configured to determine the weight of a towed vehicle based on a weight estimation algorithm. According to an exemplary embodiment of the present disclosure, the controller 170 may be configured to determine the weight of the towed vehicle based on driving information obtained through vehicle driving. The controller 170 may be configured to determine whether the weight estimation condition is satisfied based on the accelerator pedal position included in the driving information, the amount of braking according to a change in the brake pedal position, the inclination, and wheel slip, or the like. When it is determined that the weight estimation condition is satisfied, the controller 170 may be configured to determine a weight based on reduction gear efficiency, tire rolling radius, motor torque, or driving load. For example, the controller 170 may be configured to determine the weight of the towed vehicle based on Equation 1.

$$m = \frac{\int_{t0}^{t1} \left[ \frac{\eta_{RD}}{\gamma_{tire}} \left( \tau_{Mot}^{BeAj} \right) - \left( f_0 + f_1 v + f_2 v^2 \right) \right] dt}{\left[ \Delta v + \int_{t0}^{t1} g \sin\theta dt \right]} \qquad \text{<Equation 1>}$$

(where m is the estimated weight, $\eta_{RD}$ is the reduction gear efficiency, $\gamma_{tire}$ is the tire rolling radius, $\tau_{Mot}^{BeAj}$ is the motor torque, $f_0, f_1, f_2$ are the driving loads, $\theta$ is the angle between an inclined road surface and a horizontal plane, t0 is a first time for starting the weight of the towed vehicle determination, t1 is a second time for terminating the weight of the towed vehicle determination, v is speed of the towed vehicle, and g is longitudinal acceleration.

According to an exemplary embodiment of the present disclosure, the controller 170 may be configured to determine a difference between an estimated weight determined through Equation 1 and a vehicle weight (determined in advance) estimated when not connecting to a towed vehicle, as the weight of the towed vehicle. According to another exemplary embodiment of the present disclosure, the controller 170 may be configured to determine a difference between the estimated weight determined through Equation 1 and a weight of a unloaded vehicle, which is stored as vehicle specifications, as the weight of the towed vehicle.

According to an exemplary embodiment of the present disclosure, the controller 170 may compare a towable weight for each of at least one route found for the destination with the weight of the towed vehicle. The controller 170 may be configured to determine a route in which the towable weight exceeds the weight of the towed vehicle among at least one route found for the destination as a towable route, and determine the towable route as a route that enables safe driving while connecting to the towed vehicle. Accordingly, the controller 170 may output at least one towable route in which the towable weight exceeds the weight of the towed vehicle through the output device 150 to provide the user with a safe driving route. Furthermore, the controller 170 may output through the output device 150 a guide message informing that driving is possible on the towable route of routes found for the weight of the towed vehicle. Furthermore, the controller 170 may also output the towable weight according to the towable route. Therefore, the controller 170 may allow the user to additionally load an article into the towed vehicle within a range where the weight of the towed vehicle does not exceed the towable weight when the towable weight according to the towable route exceeds the weight of the towed vehicle. A more detailed description will be provided with reference to FIG. 4.

Figure 4:
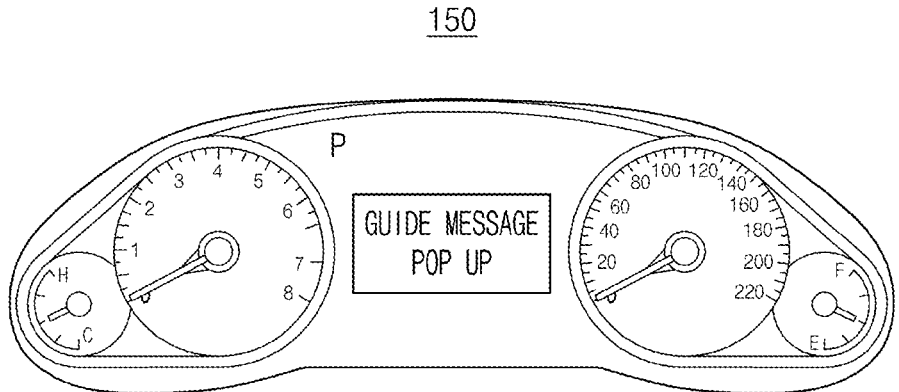
FIG. 4 is a schematic diagram of a method of outputting a notification message provided to a user according to an exemplary embodiment of the present disclosure.

FIG. 4 is a schematic diagram of a method of outputting a notification message provided to a user according to an exemplary embodiment of the present disclosure.

Referring to FIG. 4, the controller 170 may output, through a cluster, information on at least one towable route in which a towable weight exceeds the weight of a towed vehicle as a pop-up message, or a guide message notifying that it is possible to drive on a towable route among found routes. However, the present disclosure is not limited thereto, and the controller 170 may transmit a guide message output as a pop-up message to a user terminal to allow the user to identify the guide message through the user terminal.

On the other hand, when it is determined that there is no towable route among routes found for the destination, the controller 170 may be configured to determine that safe driving is hard while connecting to the towed vehicle along the route found for the destination.

According to an exemplary embodiment of the present disclosure, the controller 170 may re-search a new towable route that driving is possible regardless of the weight of the towed vehicle, and output a result of the re-search through the output device 150. For example, the controller 170 may output "A new towable route in which driving is possible regardless of the weight of the towed vehicle has been re-searched." as a guide message. According to an exemplary embodiment of the present disclosure, the controller 170 may output a guide message indicating that a new towable path has been re-searched, as a pop-up message through the cluster, as shown in FIG. 4, to improve user awareness. However, the present disclosure is not limited thereto, and the controller 170 may transmit a guide message output as a pop-up message to a user terminal to allow the user to identify the guide message through the user terminal.

According to an exemplary embodiment of the present disclosure, the new route may be searched by additionally considering at least one of a distance, a required time, a cost, or any combination thereof, more than a route initially found after a destination is input. The controller 170 may allow the user to move to the destination while holding equipment loaded on the towed vehicle by re-searching a towable route that driving to the destination is possible regardless of the weight of the towed vehicle.

According to an exemplary embodiment of the present disclosure, the controller 170 may be configured to determine whether a result of re-search is selected by the user. The controller 170 may be configured to determine whether a result of re-search is selected based on a user input received through the input device 130 or by receiving a user input, which is input through a user terminal, from the user terminal.

When it is determined that the result of re-search is selected by the user, the controller 170 may notify a new towable route to the destination through the output device 150 based on the result of re-search. That is, when it is determined that the result of re-search is selected by the user, the controller 170 may be configured to determine that the user wants to move to the destination while holding equipment loaded in the towed vehicle even though at least one of a distance, a required time, a cost, or any combination thereof is additionally considered, compared to the initially found route and provide guide for the route to the destination based on the result of re-search.

On the other hand, when it is determined that the result of re-search is not selected by the user, the controller 170 may be configured to determine that the user does not want a route in which at least one of a distance, a required time, a cost, or any combination thereof is additionally considered, compared to the initially found route. Therefore, the controller 170 cannot provide guide for the route to the destination based on the re-found route, and determine that safe driving to the destination is hard along a previously-found route due to the weight of the towed vehicle because the towable weight does not exceed the weight of the towed vehicle.

According to an exemplary embodiment of the present disclosure, the controller 170 may output, through the output device 150, a guide message guiding the user to reduce the weight of the towed vehicle when it is determined that the result of re-search is not selected by the user. For example, the controller 170 may output a guide message of "Please, reduce the loading weight of the towed vehicle." According to an exemplary embodiment of the present disclosure, the controller 170 may output a guide message guiding the user to reduce the weight of the towed vehicle as a pop-up message through the cluster as shown in FIG. 4 to improve user awareness. However, the present disclosure is not limited thereto, and the controller 170 may transmit a guide message output as a pop-up message to a user terminal to allow the user to identify the guide message through the user terminal.

According to an exemplary embodiment of the present disclosure, the controller 170 may output an additional guide message based on a towable weight for each of at least one previously-found route along with a guide message guiding the user to reduce the weight of the towed vehicle. For example, the controller 170 may output the towable weight for each of previously-found routes according to the shortest distance, the minimum required time, and the minimum cost, and output an additional guide message guiding the user to reduce the weight based on the towable weight. Accordingly, the controller 170 may allow the user to reduce the weight by considering all of the shortest distance, the minimum required time, the minimum cost, and the towable weight for each route.

According to an exemplary embodiment of the present disclosure, the controller 170 may stop outputting the pop-up message when the weight of the towed vehicle is less than the towable weight so that the user can easily recognize that the weight of the towed vehicle is less than the towable weight. Accordingly, the controller 170 may allow the user to get off objects loaded on the towed vehicle until the pop-up message disappears by enabling the user to determine that the weight of the towed vehicle is less than the towable weight when the pop-up message disappears, thus making the weight of the vehicle less than the towable weight.

According to an exemplary embodiment of the present disclosure, the controller 170 may re-determine whether the towable weight exceeds the weight of the towed vehicle when the output of the pop-up message is stopped, and a towable route in which driving is possible regardless of the weight when the towable weight exceeds the weight of the towed vehicle, which has been reduced by the user.

Accordingly, the controller 170 may provide guide for a route in which driving is possible regardless of the weight of the towed vehicle only when the towable weight exceeds the weight of the towed vehicle, thus making it possible to safely drive to the destination.

Meanwhile, when it is determined that the weight guide option is not selected by the user, the controller 170 may perform control not to output a guide message for providing guide for the towable weight of the towed device.

Figure 5:
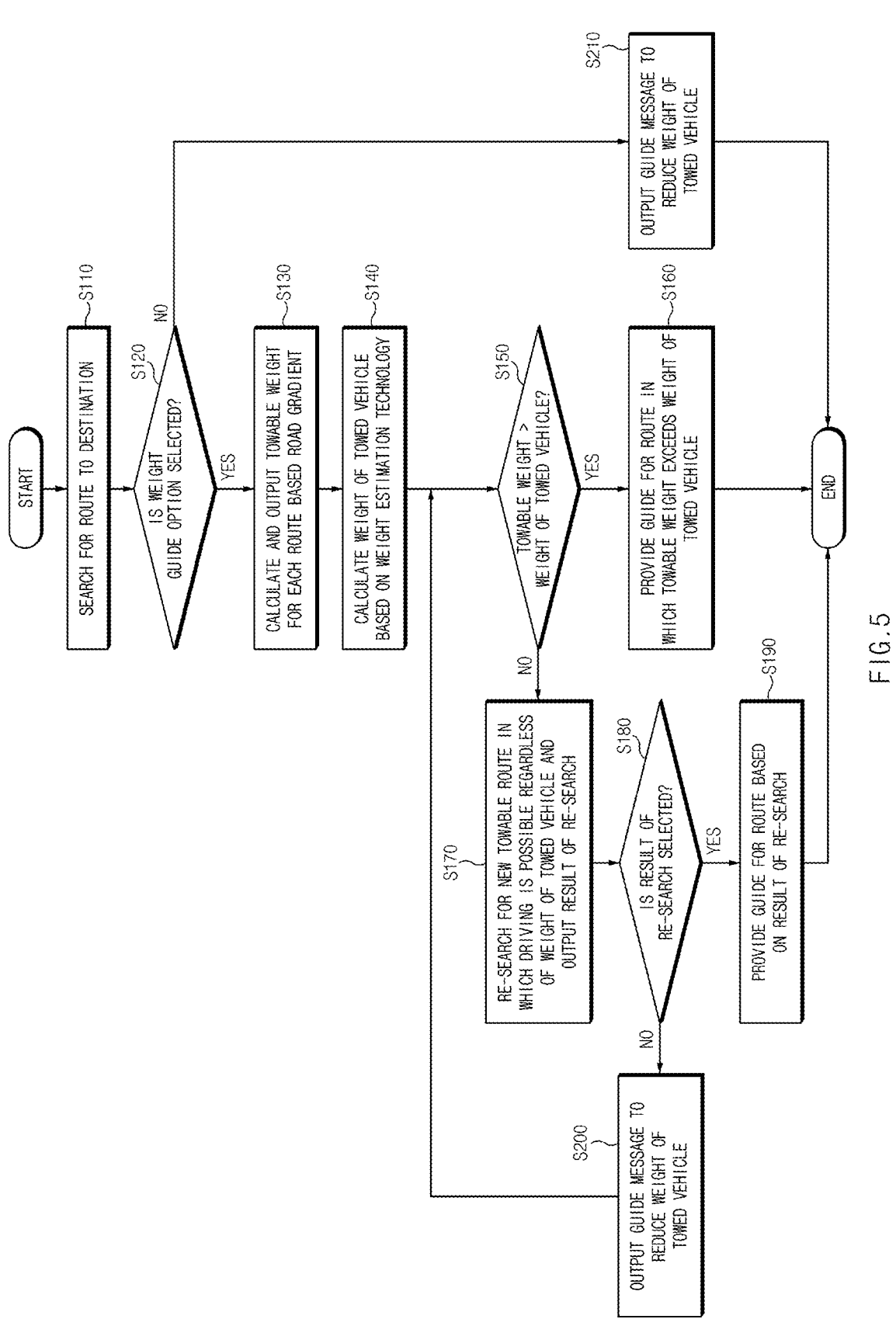
FIG. 5 is a diagram illustrating a vehicle control method according to an exemplary embodiment of the present disclosure.

FIG. 5 is a diagram illustrating a vehicle control method according to an exemplary embodiment of the present disclosure.

Referring to FIG. 5, the controller 170 may search for a route to a destination set by a user input (S110).

In S110, according to an exemplary embodiment of the present disclosure, the controller 170 may search for a route to a destination based on user input information received through the input device 130, and receive the user input information input by a user terminal through the communication device 110 to search for a route to the destination. According to another exemplary embodiment of the present disclosure, the controller 170 may search for a route to the destination when receiving the destination address information transmitted from the user terminal.

In S110, according to an exemplary embodiment of the present disclosure, the controller 170 may search for routes to the destination based on a plurality of route search options. Here, the plurality of route search options may be set based on at least one of a distance to the destination, a time required to arrive at the destination, a cost required to arrive at the destination, or any combination thereof. Accordingly, the controller 170 may search for at least one route according to the plurality of route search options.

According to an exemplary embodiment of the present disclosure, the controller 170 may be configured to determine whether a weight guide option is selected by the user based on a user input received through the input device 130 (S120). In S120, according to another exemplary embodiment of the present disclosure, the controller 170 may receive the user input by the user terminal through the communication device 110 to determine whether the weight guide option is selected by the user.

When it is determined that the weight guide option is selected by the user, the controller 170 may be configured to determine the towable weight for each of at least one route found for the destination to guide the towable weight of the towed device (S130).

In S130, according to an exemplary embodiment of the present disclosure, the controller 170 may be configured to determine the towable weight based on road gradient information included in each route found for the destination. For example, the controller 170 may be configured to determine the towable weight according to road gradient information included in at least one route found for the destination using an algorithm applied to determine the towable weight (specification information) for each road gradient stored in the storage 160.

In S130, according to an exemplary embodiment of the present disclosure, the at least one route may include a route found based on the minimum distance to the destination, a route found based on the minimum time required to reach the destination, and a route found based on the minimum cost required to reach the destination. Accordingly, the controller 170 may be configured to determine the towable weight of the towed vehicle based on gradient information of a road included in a route found based on the minimum distance to the destination, determine the towable weight of the towed vehicle based on gradient information of a road included in a route found based on the minimum time required to reach the destination, and determine the towable weight of the towed vehicle based on gradient information of a road included in a route found based on the minimum cost required to reach the destination.

In S130, according to an exemplary embodiment of the present disclosure, the controller 170 may output information on a towable weight for each of at least one route to the destination through the output device 150 when the towable weight for each of at least one route to the destination is determined. According to another exemplary embodiment of the present disclosure, the controller 170 may transmit the towable weight for each of at least one route to the user terminal. Accordingly, the controller 170 may allow the user to easily check the towable weight for each of at least one route to the destination through the user terminal as well as the output device 150.

According to an exemplary embodiment of the present disclosure, the controller 170 may be configured to determine the weight of a towed vehicle based on a weight estimation algorithm (S140).

In S140, according to an exemplary embodiment of the present disclosure, the controller 170 may be configured to determine the weight of the towed vehicle based on driving information obtained through vehicle driving. The controller 170 may be configured to determine whether the weight estimation condition is satisfied based on the accelerator pedal position included in the driving information, the amount of braking according to a change in the brake pedal position, the inclination, and wheel slip, or the like. When it is determined that the weight estimation condition is satisfied, the controller 170 may be configured to determine a weight based on reduction gear efficiency, tire rolling radius, motor torque, or driving load. For example, the controller 170 may be configured to determine the weight of the towed vehicle based on Equation 1.

In S140, according to an exemplary embodiment of the present disclosure, the controller 170 may be configured to determine a difference between an estimated weight determined through Equation 1 and a vehicle weight (determined in advance) estimated when not connecting to a towed vehicle, as the weight of the towed vehicle. According to another exemplary embodiment of the present disclosure, the controller 170 may be configured to determine a difference between the estimated weight determined through Equation 1 and a weight of a unloaded vehicle, which is stored as vehicle specifications, as the weight of the towed vehicle.

According to an exemplary embodiment of the present disclosure, the controller 170 may be configured to determine whether a towable weight for each of at least one route found for the destination exceeds the weight of the towed vehicle (S150).

In S150, the controller 170 may be configured to determine a route whose towable weight exceeds the weight of the towed vehicle among at least one route found for the destination as a towable route, and determine the towable route as a route that enables safe driving while connecting to the towed vehicle.

The controller 170 may output at least one towable route in which the towable weight exceeds the weight of the towed vehicle through the output device 150 to provide the user with a safe driving route (S160).

In S160, the controller 170 may output through the output device 150 a guide message informing that driving is possible on the towable route of routes found for the weight of the towed vehicle. Furthermore, the controller 170 may also output the towable weight according to the towable route. Therefore, the controller 170 may allow the user to additionally load an article into the towed vehicle within a range where the weight of the towed vehicle does not exceed the towable weight when the towable weight according to the towable route exceeds the weight of the towed vehicle.

In S160, the controller 170 may output, through a cluster, information on at least one towable route in which a towable weight exceeds the weight of a towed vehicle as a pop-up message, or a guide message notifying that it is possible to drive on a towable route among found routes. However, the present disclosure is not limited thereto, and the controller 170 may transmit a guide message output as a pop-up message to a user terminal to allow the user to identify the guide message through the user terminal.

On the other hand, when it is determined that there is no towable route among routes found for the destination, in S150, the controller 170 may be configured to determine that safe driving is hard while connecting to the towed vehicle along the route found for the destination.

According to an exemplary embodiment of the present disclosure, the controller 170 may re-search for new towable routes in which driving is possible regardless of the weight of the towed vehicle and output a result of the re-search through the output device 150 (S170).

For example, in S170, the controller 170 may output "A new route in which driving is possible regardless of the weight of the towed vehicle has been re-searched." as a guide message. According to an exemplary embodiment of the present disclosure, as shown in FIG. 4, the controller 170 may output a guide message indicating that a new towable route has been re-searched, as a pop-up message, through the cluster to improve user awareness. However, the present disclosure is not limited thereto, and the controller 170 may transmit a guide message output as a pop-up message to a user terminal to allow the user to identify the guide message through the user terminal.

According to an exemplary embodiment of the present disclosure, the new route may be searched by additionally considering at least one of a distance, a required time, a cost, or any combination thereof, more than a route initially found after a destination is input. The controller 170 may allow the user to move to the destination while holding equipment loaded on the towed vehicle by re-searching for a towable route that driving to the destination is possible regardless of the weight of the towed vehicle.

According to an exemplary embodiment of the present disclosure, the controller 170 may be configured to determine whether a re-search result has been selected by the user (S180). In S180, according to another exemplary embodiment of the present disclosure, the controller 170 may be configured to determine whether a result of re-search is selected based on a user input received through the input device 130 or by receiving a user input, which is input through a user terminal, from the user terminal.

When it is determined that the result of re-search is selected by the user in S180, the controller 170 may notify a new towable route to the destination through the output device 150 based on the result of re-search (S190). That is, when it is determined that the result of re-search is selected by the user, the controller 170 may be configured to determine that the user wants to move to the destination while holding equipment loaded in the towed vehicle even though at least one of a distance, a required time, a cost, or any combination thereof is additionally considered, compared to the initially found route and provide guidance for the route to the destination based on the result of re-search (S190).

On the other hand, when it is determined that the result of re-search is not selected by the user in S180, the controller 170 may be configured to determine that the user does not want a route in which at least one of a distance, a required time, a cost, or any combination thereof is additionally considered, compared to the initially found route. Therefore, the controller 170 cannot provide guide for the route to the destination based on the re-found route, and determine that safe driving to the destination is hard along a previously-found route due to the weight of the towed vehicle because the towable weight does not exceed the weight of the towed vehicle.

According to an exemplary embodiment of the present disclosure, when it is determined that the result of re-search is not selected by the user in S180, the controller 170 may output, through the output device 150, a guide message guiding the user to reduce the weight of the towed vehicle (S200).

In S200, for example, the controller 170 may output a guide message of "Please, reduce the weight of the towed vehicle." According to an exemplary embodiment of the present disclosure, the controller 170 may output a guide message guiding the user to reduce the loading weight of the towed vehicle as a pop-up message through the cluster as shown in FIG. 4 to improve user awareness. However, the present disclosure is not limited thereto, and the controller 170 may transmit a guide message output as a pop-up message to a user terminal to allow the user to identify the guide message through the user terminal.

In S200, according to an exemplary embodiment of the present disclosure, the controller 170 may output an additional guide message based on a towable weight for each of at least one previously-found route along with a guide message guiding the user to reduce the weight of the towed vehicle. For example, the controller 170 may output the towable weight for each of previously-found routes according to the shortest distance, the minimum required time, and the minimum cost, and output an additional guide message guiding the user to reduce the weight based on the towable weight. Accordingly, the controller 170 may allow the user to reduce the weight by considering all of the shortest distance, the minimum required time, the minimum cost, and the towable weight for each route.

In S200, according to an exemplary embodiment of the present disclosure, the controller 170 may stop outputting the pop-up message when the weight of the towed vehicle is less than the towable weight so that the user can easily recognize that the weight of the towed vehicle is less than the towable weight. Accordingly, the controller 170 may allow the user to get off objects loaded on the towed vehicle until the pop-up message disappears by enabling the user to determine that the weight of the towed vehicle is less than the towable weight when the pop-up message disappears, thus making the weight of the vehicle less than the towable weight.

According to an exemplary embodiment of the present disclosure, the controller 170 may re-determine whether the towable weight exceeds the weight of the towed vehicle by performing S150 when the output of the pop-up message is stopped, and a towable route in which driving is possible regardless of the weight when the towable weight exceeds the weight, which has been reduced by the user.

Accordingly, the controller 170 may provide guide for a towable route in which driving is possible regardless of the weight of the towed vehicle only when the towable weight exceeds the weight of the towed vehicle, thus making it possible to safely drive to the destination.

Meanwhile, when it is determined that the weight guide option is not selected by the user in S120, the controller 170 may perform control not to output a guide message for providing guide for the towable weight of the towed device (S210).

Figure 6:
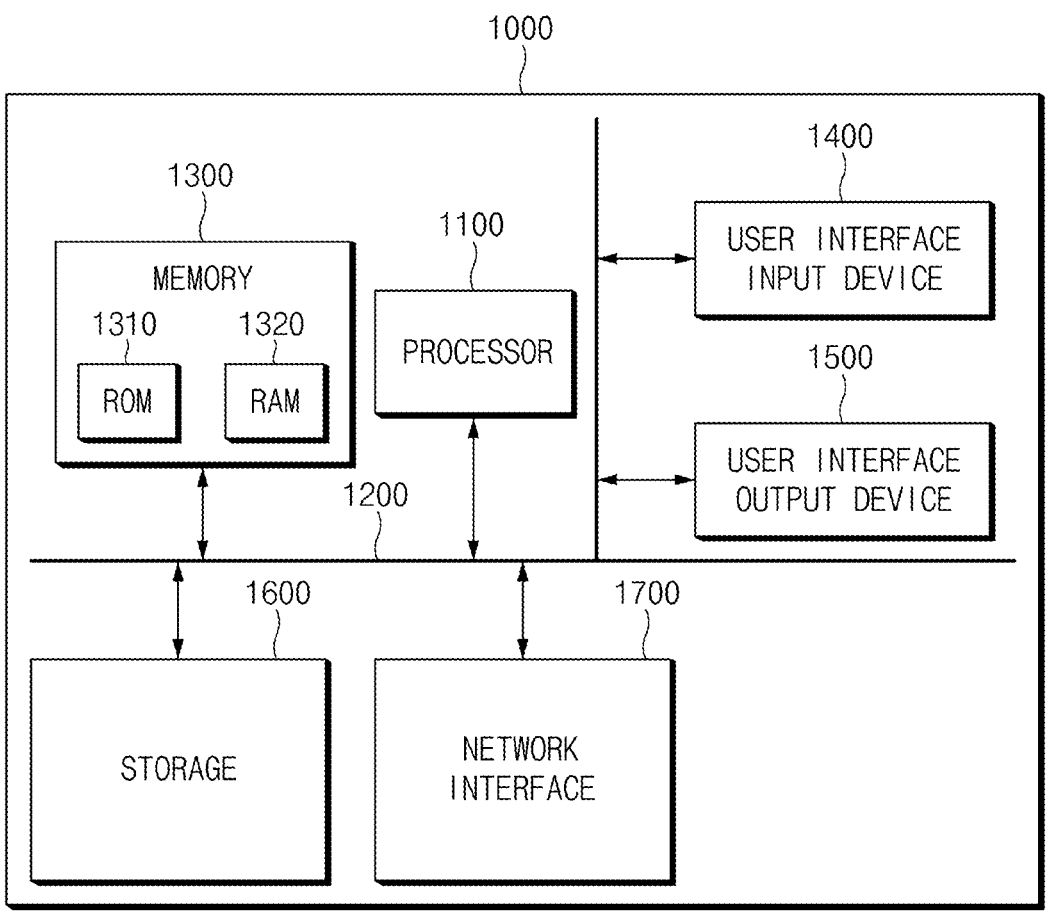
FIG. 6 illustrates a configuration of a computing system for executing a method according to an exemplary embodiment of the present disclosure.

FIG. 6 illustrates a configuration of a computing system for executing a method according to an exemplary embodiment of the present disclosure.

Referring to FIG. 6, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the exemplary embodiment included in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The vehicle control apparatus and method according to the exemplary embodiments of the present disclosure may enable a user to safely drive to a destination by providing a towable weight of a towed vehicle based on information on road gradients on a route to a destination.

The vehicle control apparatus and method according to the exemplary embodiments of the present disclosure may provide guide for a towable weight of a towed vehicle for each of road gradients along with at least one driving route and required time for each of the road gradients on a route to a destination.

The vehicle control apparatus and method according to the exemplary embodiments of the present disclosure may compare a weight loaded on a vehicle with the towable weight of a towed vehicle for each of road gradients and output a comparison result to allow a driver to intuitively identify whether it is possible to tow the towed vehicle.

The vehicle control apparatus and method according to the exemplary embodiments of the present disclosure may allow a driver to select a route to a destination in which driving is possible regardless of a loaded weight of the vehicle based on the towable weight of the towed vehicle for each road gradient or guide the driver to reduce the weight of the vehicle.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus comprising:
a location acquisition device configured to provide information on road gradients along at least one route to a destination;
a sensor configured to obtain driving information of a towing vehicle to which a towed vehicle is connected;
a controller operatively connected to the location acquisition device and the sensor and configured to determine a towable weight for each of routes found for the destination based on the information on the road gradients, determine a weight of the towed vehicle based on the driving information, compare the towable weight with the weight, and determine at least one of whether it is possible to tow the towed vehicle, a towable route, a towable weight corresponding to the towable route, or any combination thereof based on a result of the comparing; and
a communication device configured to perform communication with a user terminal,
wherein thorough the communication device, the towing vehicle receives destination address information from the user terminal, based on that the destination is input in the user terminal and transmission of the destination is input in the user terminal,
wherein the towable weight for each of routes found for the destination includes a first towable weight determined based on a first route found based on a minimum distance to the destination, a second towable weight determined based on a second route found based on minimum time required to reach the destination, and a third towable weight determined based on a third route found based on a minimum cost required to reach the destination.

2. The vehicle control apparatus of claim 1, wherein the controller is further configured to perform control to output towable weights for each of the routes to an output device operatively connected to the controller.

3. The vehicle control apparatus of claim 1, wherein the controller is further configured to determine a route in which the towable weight exceeds the weight of the towed vehicle among the routes found for the destination as the towable route, and to output the towable route.

4. The vehicle control apparatus of claim 1, wherein the controller is further configured to re-search for a new towable route in which driving to the destination is possible regardless of the weight of the towed vehicle upon concluding there is no towable route among the routes found for the destination and output a result of the re-search.

5. The vehicle control apparatus of claim 4, wherein the controller is further configured to determine whether the result of the re-search is selected by a user.

6. The vehicle control apparatus of claim 5, wherein the controller is further configured to provide guide for a route to the destination based on the result of the re-search upon concluding that the result of the re-search is selected by the user.

7. The vehicle control apparatus of claim 6, wherein the controller is further configured to output a guide message to reduce the weight upon concluding that the result of the re-search is not selected by the user.

8. The vehicle control apparatus of claim 1, wherein the controller is further configured to search for a route to the destination based on a plurality of route search options.

9. The vehicle control apparatus of claim 8, wherein the plurality of route search options are set based on at least one of a distance, a required time, a cost and any combination thereof.

10. The vehicle control apparatus of claim 1, further including:
the communication device operatively connected to the controller and configured to receive the destination from the user terminal and transmit the towable weight to the user terminal.

11. A vehicle control method, comprising:
determining, by a controller, a towable weight for each of routes found for a destination based on information on road gradients on at least one route to the destination;
determining, by the controller, a weight of a towed vehicle based on driving information;
comparing, by the controller, the towable weight with the weight, and determining, by the controller, at least one of whether it is possible to tow the towed vehicle, a towable route, a towable weight corresponding to the towable route, or any combination thereof based on a result of the comparing;
performing, by a communication device, communication with a user terminal; and
transmitting, by the user terminal, destination address information to the towing vehicle thorough the communication device, when the destination is input in the user terminal and transmission of the destination is input in the user terminal,
wherein the towable weight for each of routes found for the destination includes a first towable weight determined based on a first route found based on a minimum distance to the destination, a second towable weight determined based on a second route found based on minimum time required to reach the destination, and a third towable weight determined based on a third route found based on a minimum cost required to reach the destination.

12. The vehicle control method of claim 11, further including:

outputting, by the controller, towable weights for each of the routes to an output device operatively connected to the controller.

13. The vehicle control method of claim 11, further including:

determining, by the controller, a route in which the towable weight exceeds the weight of the towed vehicle among the routes found for the destination as the towable route, and outputting, by the controller, the towable route.

14. The vehicle control method of claim 11, further including:

re-searching, by the controller, for a new towable route in which driving to the destination is possible regardless of the weight of the towed vehicle upon concluding that there is no towable route among the routes found for the destination and outputting, by the controller, a result of the re-search.

15. The vehicle control method of claim 14, further including:

determining, by the controller, whether the result of the re-search is selected by a user.

16. The vehicle control method of claim 15, further including:

providing, by the controller, guide for a route to the destination based on the result of the re-search upon concluding that the result of the re-search is selected by the user.

17. The vehicle control method of claim 16, further including:

outputting, by the controller, a guide message to reduce the weight upon concluding that the result of the re-search is not selected by the user.

18. The vehicle control method of claim 11, further including:

searching, by the controller, for a route to the destination based on a plurality of route search options.

19. The vehicle control method of claim 18, wherein the plurality of route search options are set based on at least one of a distance, a required time, a cost and any combination thereof.

20. The vehicle control method of claim 11, further including:

receiving, by the controller, the destination from the user terminal; and transmitting, by the controller, the towable weight to the user terminal.

\* \* \* \* \*